United States Patent
Hsu et al.

(10) Patent No.: US 11,900,816 B2
(45) Date of Patent: Feb. 13, 2024

(54) VEHICLE PLATOON FOLLOWING DECIDING SYSTEM BASED ON CLOUD COMPUTING AND DECIDING METHOD THEREOF

(71) Applicant: Automotive Research & Testing Center, Changhua County (TW)

(72) Inventors: Hsiang Chieh Hsu, Changhua County (TW); Tsung-Ming Hsu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 145 days.

(21) Appl. No.: 17/456,887

(22) Filed: Nov. 30, 2021

(65) Prior Publication Data

US 2023/0169870 A1 Jun. 1, 2023

(51) Int. Cl.
*G05D 1/02* (2020.01)
*B60W 50/14* (2020.01)
(Continued)

(52) U.S. Cl.
CPC .............. *G08G 1/22* (2013.01); *B60W 50/14* (2013.01); *G05D 1/0276* (2013.01);
(Continued)

(58) Field of Classification Search
CPC ........ G08G 1/22; B60W 50/14; B60W 30/16; B60W 2520/10; B60W 2520/105;
(Continued)

(56) References Cited

U.S. PATENT DOCUMENTS

| | | | |
|---|---|---|---|
| 10,254,764 | B2 | 4/2019 | Laubinger et al. |
| 2019/0130765 | A1* | 5/2019 | Tulpule ................ G05D 1/0293 |
| 2020/0057453 | A1 | 2/2020 | Laws et al. |

FOREIGN PATENT DOCUMENTS

| | | |
|---|---|---|
| CN | 111696338 A | 9/2020 |
| CN | 112005183 A | 11/2020 |

(Continued)

OTHER PUBLICATIONS

Xiulan Song et al., "Time delay feedback cooperative adaptive cruise control of connected vehicles by heterogeneous channel transmission", Measurement and Control, first published online Apr. 24, 2019, vol. 52, Issue 5-6, pp. 369-378, published by Sage Publications Inc., United States.

*Primary Examiner* — Rodney A Butler
(74) *Attorney, Agent, or Firm* — CKC & Partners Co., LLC

(57) ABSTRACT

A vehicle platoon following deciding system based on cloud computing is configured to decide a plurality of vehicle platoon accelerations of a leading vehicle and at least one following vehicle. A cloud processing unit receives a leading vehicle parameter group and at least one following vehicle parameter group. The cloud processing unit is configured to implement a cloud deciding step. The cloud deciding step includes judging whether the leading vehicle is manually driven according to the leading vehicle parameter group to generate a driving mode judging result, calculating a driving acceleration range according to a leading vehicle acceleration range and at least one following vehicle acceleration range, estimating a compensated acceleration according to the leading vehicle parameter group, and calculating the vehicle platoon accelerations according to the driving mode judging result and at least one of the driving acceleration range and the compensated acceleration.

20 Claims, 11 Drawing Sheets

(51) Int. Cl.
*G08G 1/00* (2006.01)
*H04L 67/12* (2022.01)
*B60W 30/16* (2020.01)

(52) U.S. Cl.
CPC ........... *G05D 1/0295* (2013.01); *B60W 30/16* (2013.01); *B60W 2520/10* (2013.01); *B60W 2520/105* (2013.01); *B60W 2530/10* (2013.01); *B60W 2540/10* (2013.01); *B60W 2540/12* (2013.01); *B60W 2552/15* (2020.02); *B60W 2552/30* (2020.02); *B60W 2554/4041* (2020.02); *B60W 2554/4042* (2020.02); *B60W 2556/45* (2020.02); *B60W 2710/18* (2013.01); *H04L 67/12* (2013.01)

(58) Field of Classification Search
CPC ......... B60W 2530/10; B60W 2540/10; B60W 2540/12; B60W 2552/15; B60W 2552/30; B60W 2554/4041; B60W 2554/4042; B60W 2556/45; B60W 2710/18; B60W 30/165; G05D 1/0276; G05D 1/0295; G05D 2201/0213; G05D 1/0223; G05D 1/0293; H04L 67/12
See application file for complete search history.

(56) References Cited

FOREIGN PATENT DOCUMENTS

| | | |
|---|---|---|
| CN | 112614340 A | 4/2021 |
| TW | I722652 B | 3/2021 |
| WO | 2018000386 A1 | 1/2018 |

\* cited by examiner

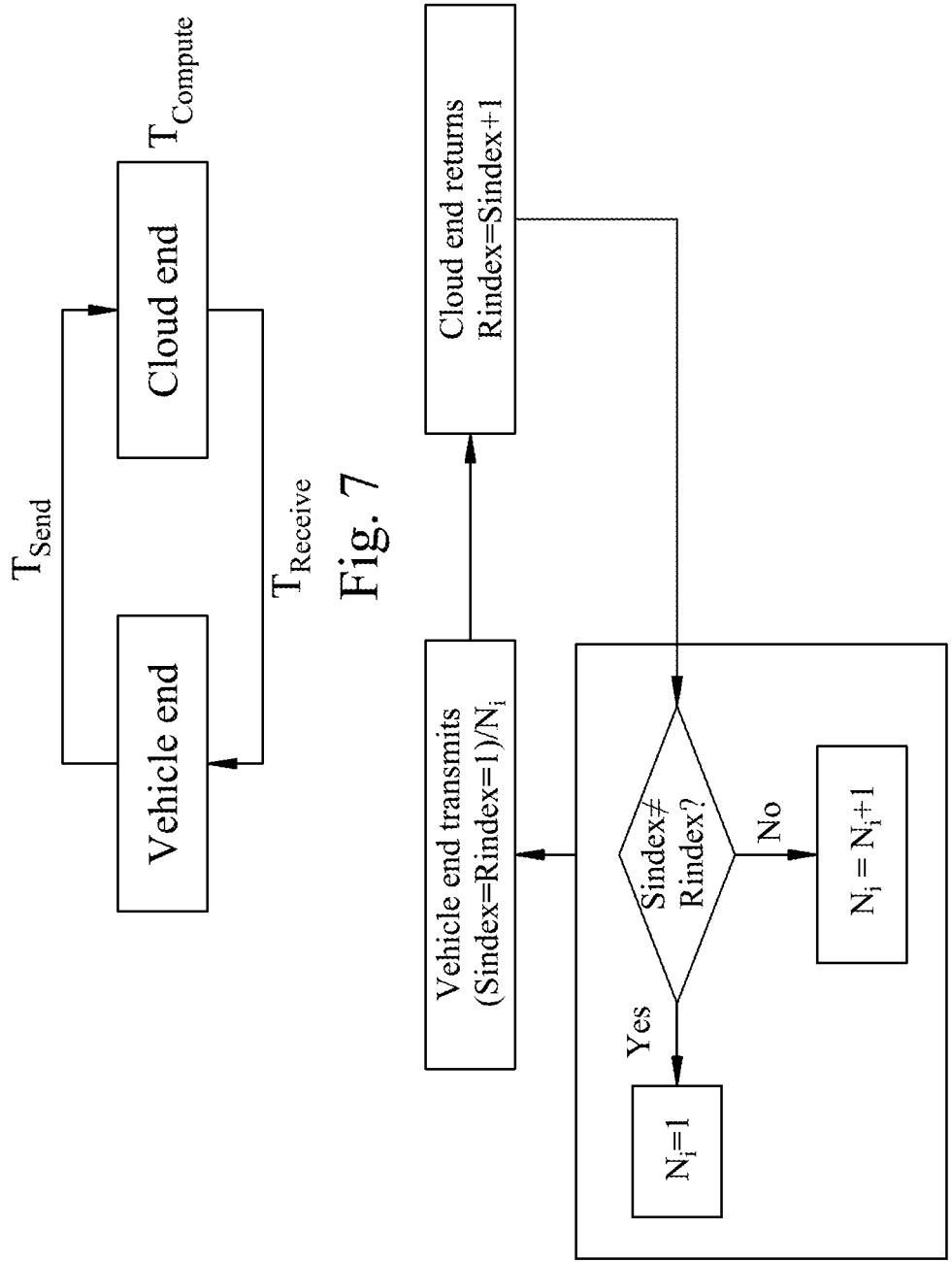

VEHICLE PLATOON FOLLOWING DECIDING SYSTEM BASED ON CLOUD COMPUTING AND DECIDING METHOD THEREOF

BACKGROUND

Technical Field

The present disclosure relates to a vehicle platoon following deciding system and a deciding method thereof. More particularly, the present disclosure relates to a vehicle platoon following deciding system based on cloud computing and a deciding method thereof.

Description of Related Art

No matter what the field of logistics and freight transportation or transport, man-hours and manpower allocation are important considerations of operating costs. If a plurality of vehicles have autonomous capability with vehicle platoon following, they can effectively improve operation and carrying efficiency. Because the use of autonomous vehicle platoon can reduce the need for manpower, and commercial transport has relatively simple application scenes, many car manufacturers have invested in the development of autonomous vehicles platoon and hope to achieve commercial autonomous vehicle platoon following as soon as possible.

Conventional vehicle platoon following deciding technologies may be divided into several types. A first type is the error correction of the vehicle platoon according to a current path and a predetermined path of the front vehicle. A second type is the position correction of the rear vehicle according to a vehicle centerline, an angle and a lane centerline of the front vehicle. A third type is the control decision of the vehicle platoon when a single obstacle cut-in front of the rear vehicle. However, the above types still encounter many bottlenecks and problems when applied to actual vehicle platoon following. For example, a delay time of each vehicle in the vehicle platoon is not considered in a longitudinal direction, the rationality of an acceleration of each vehicle is not considered when the each vehicle is switched between a manual mode and an autonomous mode, and a lack of a reasonable decision for multiple obstacles cut-in the vehicle platoon. Therefore, a vehicle platoon following deciding system based on cloud computing and a deciding method thereof which are capable of realizing a cloud integrated decision, a delay self-diagnosis, the reasonable decision for multiple obstacles cut-in the vehicle platoon and adaptively adjusting a reasonable acceleration of the each vehicle are commercially desirable.

SUMMARY

According to one aspect of the present disclosure, a vehicle platoon following deciding system based on cloud computing is configured to decide a plurality of vehicle platoon accelerations of a leading vehicle and at least one following vehicle, and includes a leading vehicle processing unit, at least one following vehicle processing unit and a cloud processing unit. The leading vehicle processing unit is disposed on the leading vehicle and configured to generate a leading vehicle parameter group. The leading vehicle parameter group includes a leading vehicle acceleration range. The at least one following vehicle processing unit is disposed on the at least one following vehicle and configured to generate at least one following vehicle parameter group. The at least one following vehicle parameter group includes at least one following vehicle acceleration range. The cloud processing unit is signally connected to the leading vehicle processing unit and the at least one following vehicle processing unit, and receives the leading vehicle parameter group and the at least one following vehicle parameter group. The cloud processing unit is configured to implement a cloud deciding step including performing a driving mode judging step, a cloud parameter uniformizing step, a cloud acceleration estimating step and a vehicle platoon acceleration calculating step. The driving mode judging step is performed to judge whether the leading vehicle is manually driven according to the leading vehicle parameter group to generate a driving mode judging result. The cloud parameter uniformizing step includes calculating a driving acceleration range according to the leading vehicle acceleration range and the at least one following vehicle acceleration range. The cloud acceleration estimating step is performed to estimate a compensated acceleration according to the leading vehicle parameter group. The vehicle platoon acceleration calculating step is performed to calculate the vehicle platoon accelerations according to the driving mode judging result and at least one of the driving acceleration range and the compensated acceleration.

According to another aspect of the present disclosure, a vehicle platoon following deciding system based on cloud computing is configured to decide a plurality of vehicle platoon accelerations of a leading vehicle and at least one following vehicle. The vehicle platoon following deciding system based on cloud computing includes a leading vehicle processing unit, at least one following vehicle processing unit and a cloud processing unit. The leading vehicle processing unit is disposed on the leading vehicle and configured to generate a leading vehicle parameter group. The leading vehicle parameter group includes a leading vehicle acceleration range. The at least one following vehicle processing unit is disposed on the at least one following vehicle and configured to generate at least one following vehicle parameter group. The at least one following vehicle parameter group includes at least one following vehicle acceleration range. The cloud processing unit is signally connected to the leading vehicle processing unit and the at least one following vehicle processing unit, and receives the leading vehicle parameter group and the at least one following vehicle parameter group. The cloud processing unit is configured to implement a cloud deciding step including generating a driving mode judging result, a driving acceleration range and a compensated acceleration according to the leading vehicle parameter group, the leading vehicle acceleration range and the at least one following vehicle acceleration range, and then calculating the vehicle platoon accelerations according to the driving mode judging result and at least one of the driving acceleration range and the compensated acceleration. One of the leading vehicle processing unit and the at least one following vehicle processing unit is configured to implement a delay diagnosing step. The delay diagnosing step includes diagnosing whether a signal delay time between the cloud processing unit and the one of the leading vehicle processing unit and the at least one following vehicle processing unit is smaller than or equal to a predetermined delay time to generate a delay diagnosis result.

According to further another aspect of the present disclosure, a deciding method of a vehicle platoon following deciding system based on cloud computing is configured to decide a plurality of vehicle platoon accelerations of a leading vehicle and at least one following vehicle. The deciding method of the vehicle platoon following deciding system based on cloud computing includes performing a cloud deciding step. The cloud deciding step includes performing a driving mode judging step, a cloud parameter uniformizing step, a cloud acceleration estimating step and a vehicle platoon acceleration calculating step. The driving mode judging step is performed to configure a cloud processing unit to judge whether the leading vehicle is manually driven according to a leading vehicle parameter group to generate a driving mode judging result. The cloud parameter uniformizing step includes configuring the cloud processing unit to calculate a driving acceleration range according to the leading vehicle acceleration range and the at least one following vehicle acceleration range. The cloud acceleration estimating step is performed to configure the cloud processing unit to estimate a compensated acceleration according to the leading vehicle parameter group. The vehicle platoon acceleration calculating step is performed to configure the cloud processing unit to calculate the vehicle platoon accelerations according to the driving mode judging result and at least one of the driving acceleration range and the compensated acceleration.

BRIEF DESCRIPTION OF THE DRAWINGS

The present disclosure can be more fully understood by reading the following detailed description of the embodiment, with reference made to the accompanying drawings as follows:

FIG. 7 shows a schematic view of a signal delay time of one of a plurality of delay diagnosing steps of FIG. 6, corresponding to a signal path.

FIG. 8 shows a flow chart of estimation of the signal delay time of the one of the delay diagnosing steps of FIG. 6.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
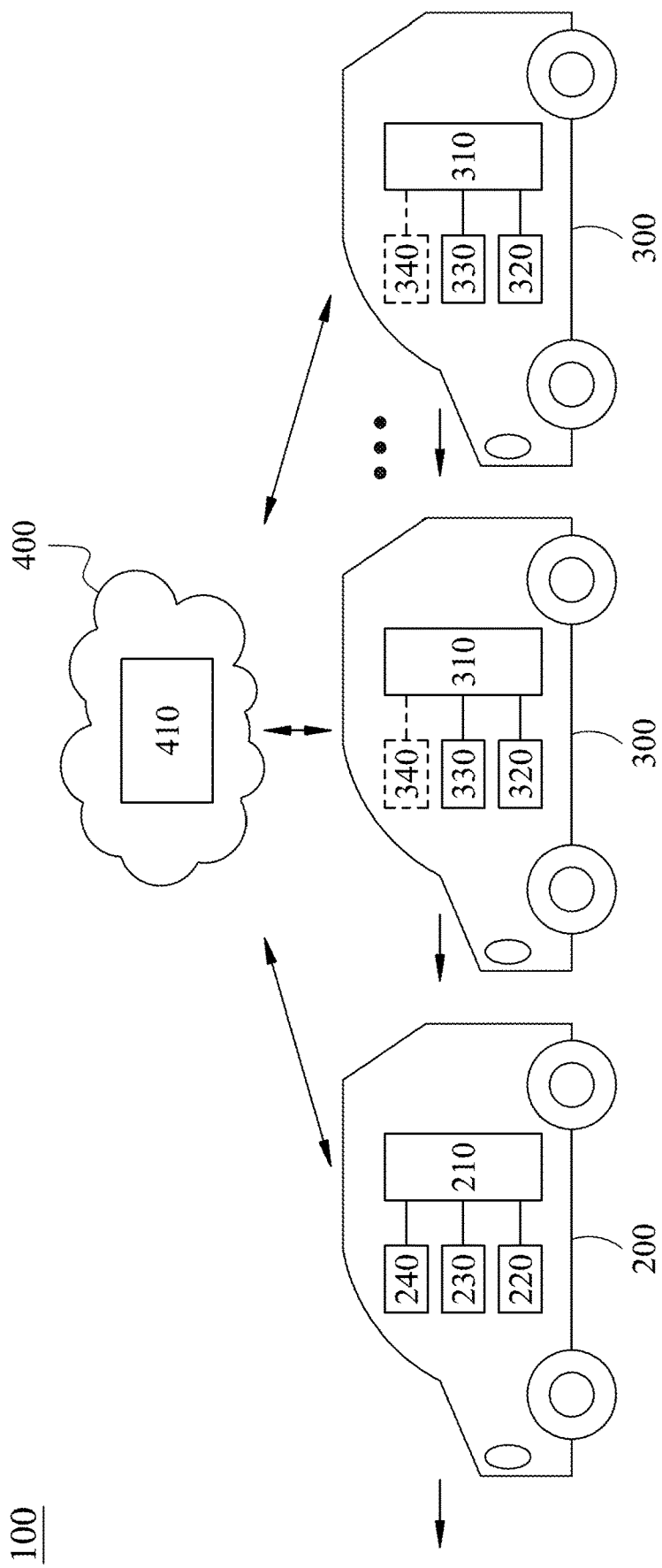
FIG. 1 shows a schematic view of a vehicle platoon following deciding system based on cloud computing according to a first embodiment of the present disclosure.
Figure 2:
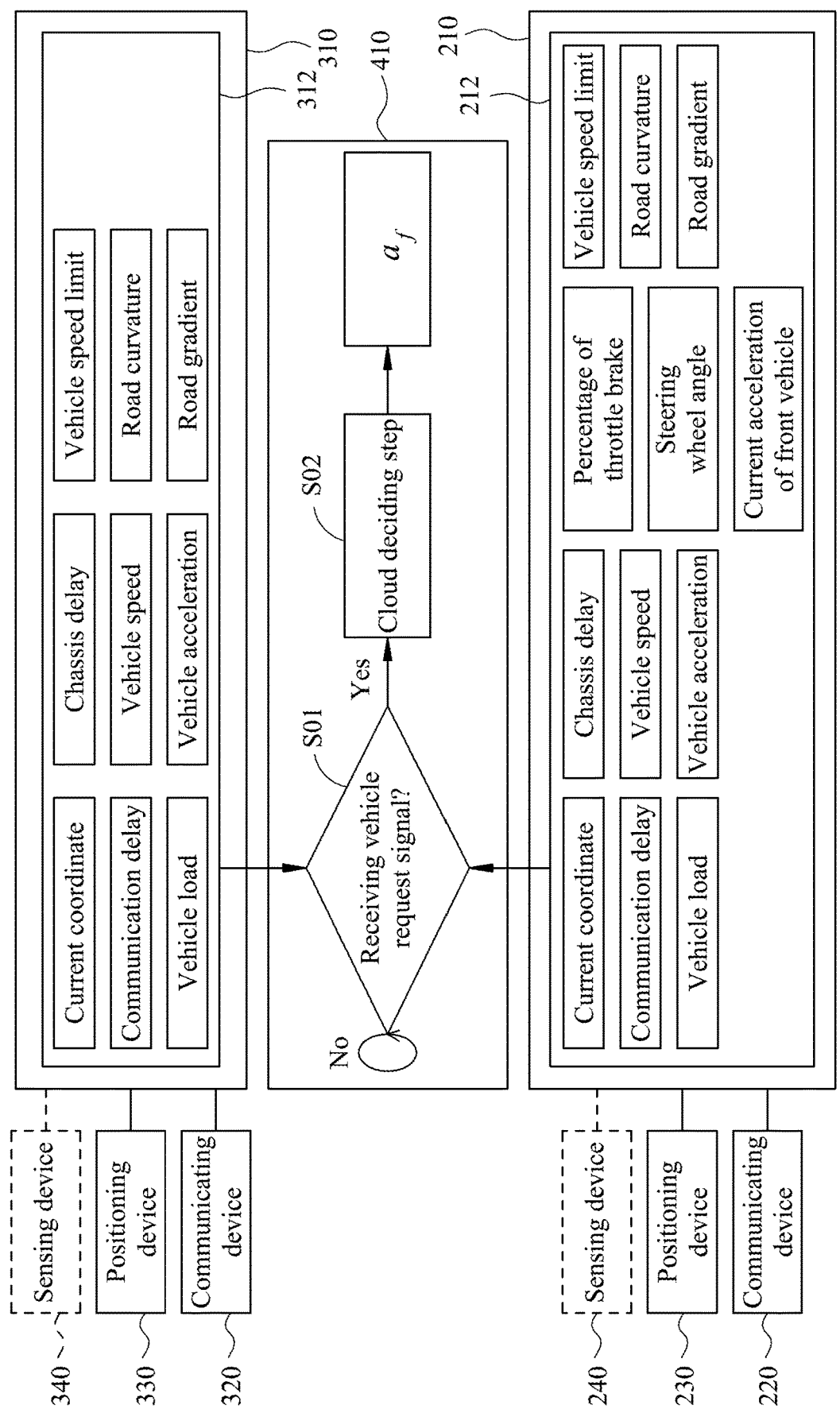
FIG. 2 shows a partial block diagram of the vehicle platoon following deciding system based on cloud computing of FIG. 1.
Figure 3:
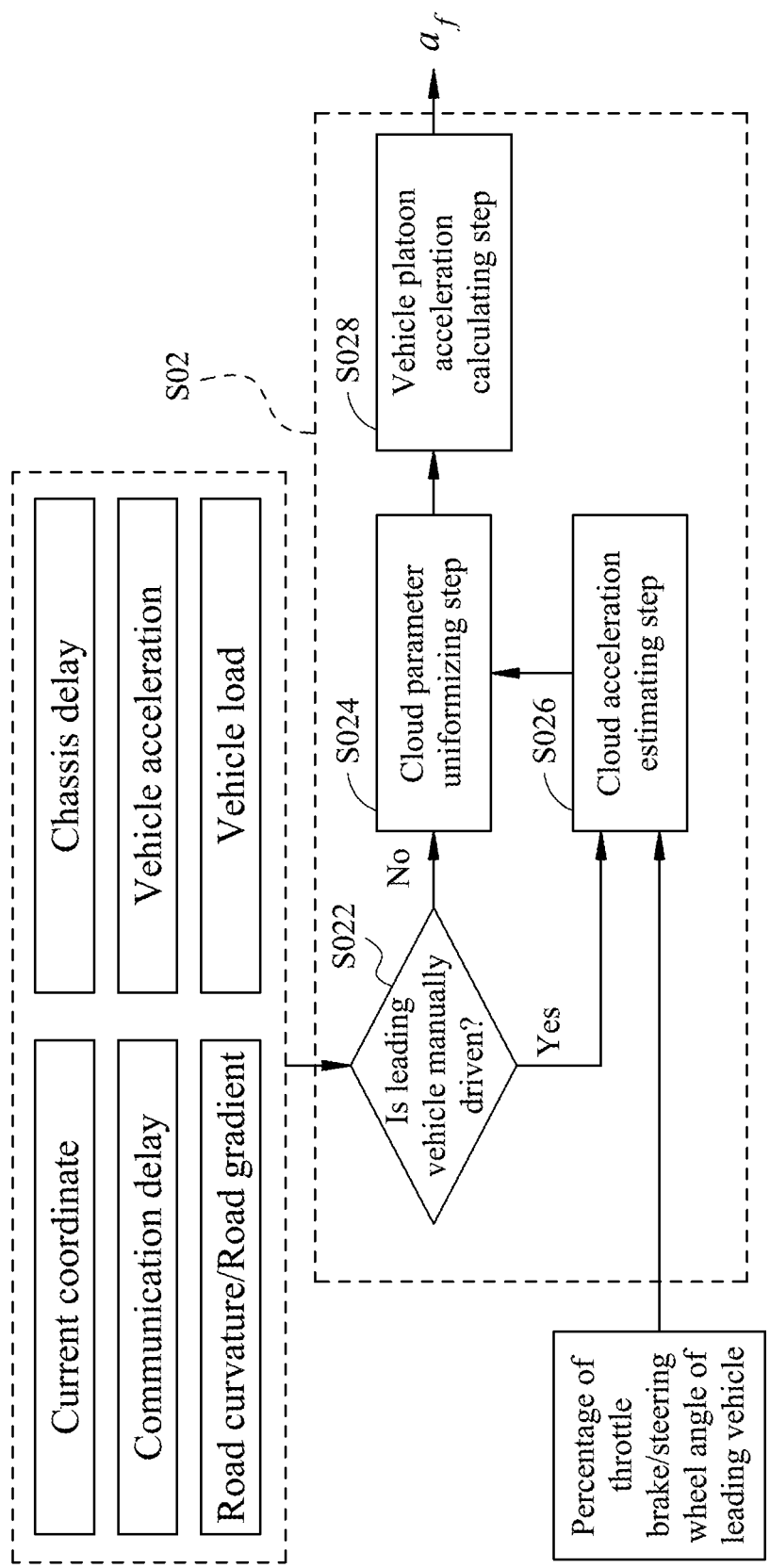
FIG. 3 shows a schematic view of a cloud deciding step of the vehicle platoon following deciding system based on cloud computing of FIG. 1.
Figure 4:
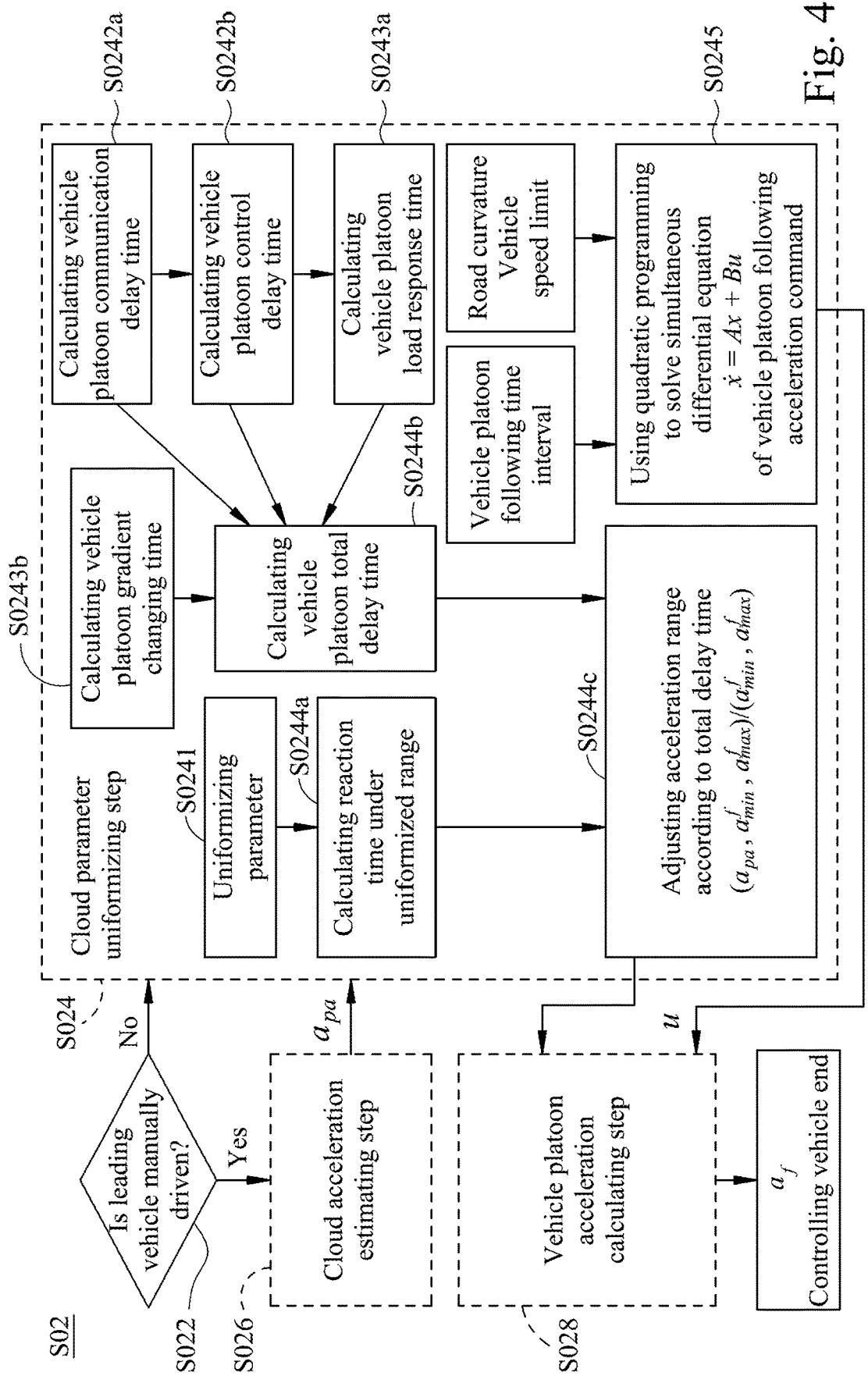
FIG. 4 shows a flow chart of a driving mode judging step, a cloud parameter uniformizing step, a cloud acceleration estimating step and a vehicle platoon acceleration calculating step of the cloud deciding step of FIG. 3.

Please refer to FIGS. 1, 2, 3 and 4. FIG. 1 shows a schematic view of a vehicle platoon following deciding system 100 based on cloud computing according to a first embodiment of the present disclosure. FIG. 2 shows a partial block diagram of the vehicle platoon following deciding system 100 based on cloud computing of FIG. 1. FIG. 3 shows a schematic view of a cloud deciding step S02 of the vehicle platoon following deciding system 100 based on cloud computing of FIG. 1. FIG. 4 shows a flow chart of a driving mode judging step S022, a cloud parameter uniformizing step S024, a cloud acceleration estimating step S026 and a vehicle platoon acceleration calculating step S028 of the cloud deciding step S02 of FIG. 3. The vehicle platoon following deciding system 100 based on cloud computing is configured to decide a plurality of vehicle platoon accelerations $a_f$ of a leading vehicle 200 and at least one following vehicle 300, and includes the leading vehicle 200, a leading vehicle processing unit 210, a communicating device 220, a positioning device 230, a sensing device 240, the at least one following vehicle 300, at least one following vehicle processing unit 310, a communicating device 320, a positioning device 330, a sensing device 340 and a cloud computing platform 400.

The leading vehicle processing unit 210, the communicating device 220, the positioning device 230 and the sensing device 240 are disposed on the leading vehicle 200. The leading vehicle processing unit 210 is signally connected to the communicating device 220, the positioning device 230 and the sensing device 240. The leading vehicle processing unit 210 is configured to generate a leading vehicle parameter group 212, and the leading vehicle parameter group 212 includes a leading vehicle acceleration range $(a_L^i, a_U^i)$, where i is equal to 1, i.e., $(a_L^1, a_U^1)$. L represents a minimum acceleration, and U represents a maximum acceleration. The communicating device 220 is configured to enable the leading vehicle processing unit 210 to communicate with the outside. The positioning device 230 is configured to position the leading vehicle 200, such as a global positioning system (GPS). The sensing device 240 is configured to sense a surrounding environment of the leading vehicle 200. In addition, in one embodiment, the leading vehicle parameter group 212 includes a current coordinate, a communication delay, a vehicle load, a chassis delay, a vehicle speed, a vehicle acceleration, a percentage of throttle brake, a steering wheel angle, a current acceleration of a front vehicle, a vehicle speed limit, a road curvature and a road gradient. The vehicle acceleration includes the leading vehicle acceleration range ($a_L^1$, $a_U^1$), but the present disclosure is not limited thereto.

The at least one following vehicle processing unit 310, the communicating device 320 and the positioning device 330 are disposed on the at least one following vehicle 300. The at least one following vehicle processing unit 310 is signally connected to the communicating device 320 and the positioning device 330. The at least one following vehicle processing unit 310 is configured to generate a following vehicle parameter group 312, and the following vehicle parameter group 312 includes at least one following vehicle acceleration range ($a_L^i$, $a_U^i$), where i is equal to one of 2 to N. N represents the total number of leading vehicle 200 and the at least one following vehicle 300, and is a positive integer greater than or equal to 2, i.e., the at least one following vehicle acceleration range ($a_L^i$, $a_U^i$)=($a_L^2$, $a_U^2$)-($a_L^N$, $a_U^N$). The communicating device 320 is configured to enable the at least one following vehicle processing unit 310 to communicate with the outside. The positioning device 330 is configured to position the at least one following vehicle 300, such as GPS. The sensing device 340 may be optional. When the sensing device 340 is disposed on the at least one following vehicle 300, the sensing device 340 is signally connected to the at least one following vehicle processing unit 310 and configured to sense a surrounding environment of the at least one following vehicle 300. In addition, in one embodiment, the following vehicle parameter group 312 includes a current coordinate, a communication delay, a vehicle load, a chassis delay, a vehicle speed, a vehicle acceleration, a vehicle speed limit, a road curvature and a road gradient. The vehicle acceleration includes the at least one following vehicle acceleration range ($a_L^2$, $a_U^2$)-($a_L^N$, $a_U^N$), but the present disclosure is not limited thereto.

The cloud computing platform 400 includes a cloud processing unit 410. The cloud processing unit 410 is signally connected to the leading vehicle processing unit 210 and the at least one following vehicle processing unit 310, and receives the leading vehicle parameter group 212 and the at least one following vehicle parameter group 312. The leading vehicle processing unit 210 and the at least one following vehicle processing unit 310 are signally connected to the cloud processing unit 410 by the communicating devices 220, 320, respectively. The cloud processing unit 410 is configured to implement a signal receiving step S01 and a cloud deciding step S02. The signal receiving step S01 is "Receiving vehicle request signal?", and represents that confirming whether to receive a vehicle request signal. If yes, receiving a vehicle parameter group (e.g., the leading vehicle parameter group 212 or the at least one following vehicle parameter group 312) and performing the cloud deciding step S02. If no, performing the signal receiving step S01 again. In addition, the cloud deciding step S02 includes performing the driving mode judging step S022, the cloud parameter uniformizing step S024, the cloud acceleration estimating step S026 and the vehicle platoon acceleration calculating step S028. The driving mode judging step S022 is performed to judge whether the leading vehicle 200 is manually driven according to the leading vehicle parameter group 212 to generate a driving mode judging result. The cloud parameter uniformizing step S024 includes calculating a driving acceleration range ($a_{min}^f$, $a_{max}^f$) according to the leading vehicle acceleration range ($a_L^1$, $a_U^1$) and the at least one following vehicle acceleration range ($a_L^2$, $a_U^2$)-($a_L^N$, $a_U^N$). The cloud acceleration estimating step S026 is performed to estimate a compensated acceleration $a_{pa}$ according to the leading vehicle parameter group 212. The vehicle platoon acceleration calculating step S028 is performed to calculate the vehicle platoon accelerations $a_f$ according to the driving mode judging result and at least one of the driving acceleration range ($a_{min}^f$, $a_{max}^f$) and the compensated acceleration $a_{pa}$. Therefore, the vehicle platoon following deciding system 100 based on cloud computing of the present disclosure utilizes the cloud parameter uniformizing step S024 and the cloud acceleration estimating step S026 to realize vehicle platoon following decisions in different driving modes.

Figure 5:
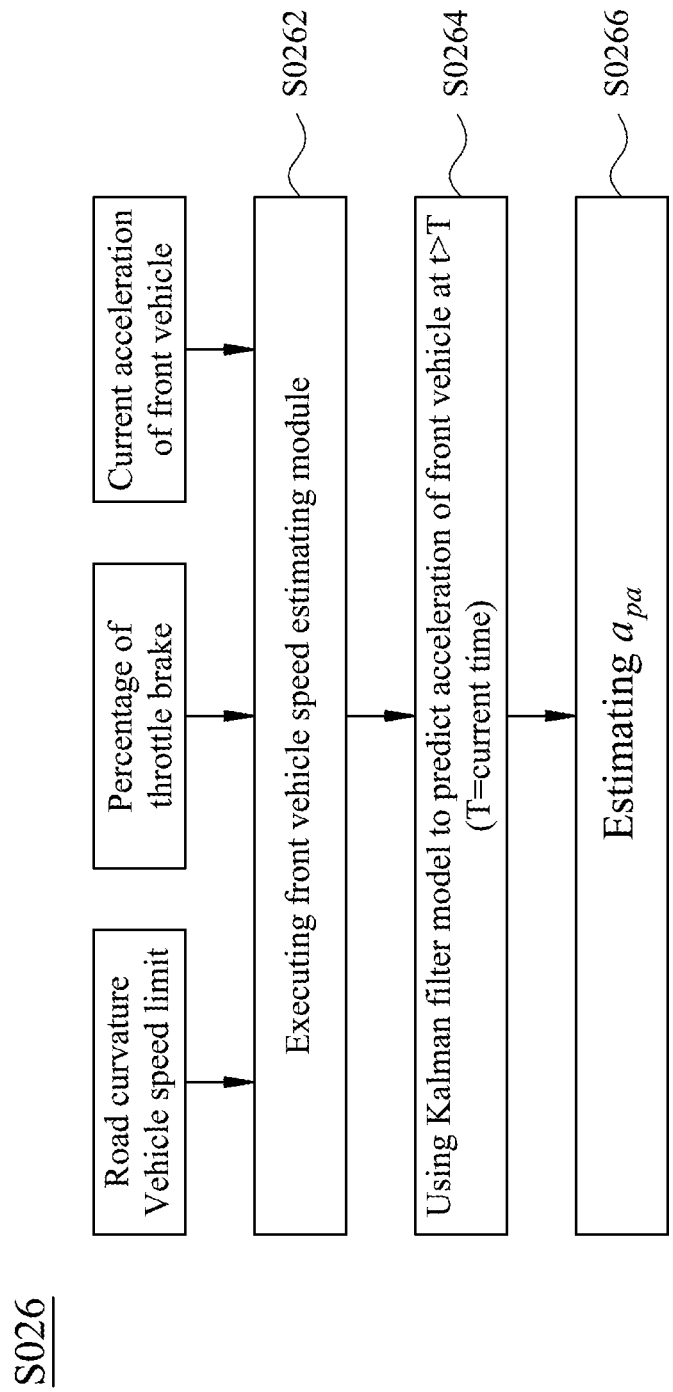
FIG. 5 shows a flow chart of the cloud acceleration estimating step of FIG. 4.

Please refer to FIGS. 1, 2, 3, 4 and 5. FIG. 5 shows a flow chart of the cloud acceleration estimating step S026 of FIG. 4. The driving mode judging step S022 is "Is leading vehicle manually driven?", and represents that judging whether the leading vehicle 200 is manually driven according to the current coordinate, the communication delay, the road curvature, the road gradient, the chassis delay, the vehicle acceleration and the vehicle load of the leading vehicle parameter group 212 to generate the driving mode judging result. If yes, performing the cloud acceleration estimating step S026. If no, performing the cloud parameter uniformizing step S024. The driving mode judging result has two types of modes. One is that the leading vehicle 200 is in an autonomous mode, and the other is that the leading vehicle 200 is in a manual mode.

The cloud parameter uniformizing step S024 includes a plurality of steps S0241, S0242a, S0242b, S0243a, S0243b, S0244a, S0244b, S0244c, S0245. The step S0241 is "Uniformizing parameter", and represents that calculating a uniformized acceleration range parameter ($a_{min}$, $a_{max}$) according to the leading vehicle acceleration range ($a_L^1$, $a_U^1$) and the at least one following vehicle acceleration range ($a_L^2$, $a_U^2$)-($a_L^N$, $a_U^N$). The uniformized acceleration range parameter ($a_{min}$, $a_{max}$) meets the following equations (1) and (2):

$$a_{min} = \max\{a_L^1, \ldots, a_L^N\} \tag{1}$$

$$a_{max} = \min\{a_U^1, \ldots, a_U^N\} \tag{2}$$

max represents obtaining a maximum value, and min represents obtaining a minimum value. In addition, the leading vehicle processing unit 210 is configured to generate a leading vehicle control delay time $t_1^a$ and a leading vehicle communication delay time $t^*_{com1}$. The at least one following vehicle processing unit 310 is configured to generate at least one following vehicle control delay time ($t_2^a$-$t_N^a$) and at least one following vehicle communication delay time $t^*_{com2}$. The leading vehicle communication delay time $t^*_{com1}$ and the at least one following vehicle communication delay time $t^*_{com2}$ meet the following equations (3) and (4), respectively:

$$t^*_{com1} = \begin{bmatrix} C_L^i \\ C_L^i \end{bmatrix}, i = 1. \tag{3}$$

$$t^*_{com2} = \begin{bmatrix} C_L^i \\ C_U^i \end{bmatrix}, i = 2, \ldots, N. \tag{4}$$

C represents a communication status. In addition, the step S0242a is "Calculating vehicle platoon communication delay time", and represents that calculating a communication delay time $t^*_{com}$ according to the leading vehicle communication delay time $t^*_{com1}$ and the at least one following vehicle communication delay time $t^*_{com2}$. The communication delay time $t^*_{com}$ is a set of the leading vehicle communication delay time $t^*_{com1}$ and the at least one following vehicle communication delay time $t^*_{com2}$. Moreover, the step S0242b is "Calculating vehicle platoon control delay time", and represents that calculating a control delay time $t^*_{con}$ according to the leading vehicle control delay time $t_1^a$ and the at least one following vehicle control delay time $(t_2^a - t_N^a$. The control delay time $t^*_{con}$ meets the following equation (5):

$$t^*_{con} = \max\{t_1^a, \ldots, t_N^a\} \quad (5).$$

a represents an acceleration. In addition, the leading vehicle parameter group 212 includes a vehicle speed V, a vehicle load $m_i$ and a road gradient. The step S0243a is "Calculating vehicle platoon load response time", and represents that calculating a load response time $t_m^i$ according to the vehicle speed V, an initial vehicle speed $V_0$, a vehicle external force $F_i$ and the vehicle load $m_i$. The step S0243b is "Calculating vehicle platoon gradient changing time", and represents that calculating a gradient changing time $t_{slo}^i$ according to the vehicle speed V, the initial vehicle speed $V_0$, the vehicle external force $F_i$, the vehicle load $m_i$ and the road gradient. The load response time $t_m^i$ and gradient changing time $t_{slo}^i$ are calculated to obtain a vehicle platoon load gradient response time $(t^*_m + t^*_{slo})$. The vehicle platoon load gradient response time $(t^*_m + t^*_{slo})$ meets the following equations (6)-(10):

$$t_m^i = \frac{V - V_0}{F_i/m_i}, i = 1, 2, \ldots, N, \text{ if slope } = 0. \quad (6)$$

$$t_m^i + t_{slo}^i = \frac{V - V_0}{F_i/m_i}, i = 1, 2, \ldots, N, \text{ if slope } \neq 0. \quad (7)$$

$$F_i = F_T - (F_{roll} + F_{grav} + F_{drg}). \quad (8)$$

$$t_m^* = \max(t_m^i) - \min(t_m^i), \text{ and } t_{slo}^* = 0, \text{ if slope } = 0. \quad (9)$$

$$t_m^* + t_{slo}^* = \max(t_m^i + t_{slo}^i) - \min(t_m^i + t_{slo}^i), \text{ if slope } \neq 0. \quad (10)$$

$F_T$, $F_{roll}$, $F_{grav}$, $F_{drg}$ and slope represent a driving force, a rolling resistance, a forward friction, an air resistance and the road gradient, respectively. In addition, the step S0244a is "Calculating reaction time under uniformized range", and represents that calculating a plurality of reaction times $t^*_{a_{min}}$, $t^*_{a_{max}}$ according to the vehicle speed V, the initial vehicle speed $V_0$ and the uniformized acceleration range parameter $(a_{min}, a_{max})$. The reaction times $t^*_{a_{min}}$, $t^*_{a_{max}}$ meet the following equation (11):

$$V = V_0 + at; \begin{cases} t^*_{a_{min}} = \dfrac{V - V_0}{a_{min}} \\ t^*_{a_{max}} = \dfrac{V - V_0}{a_{max}} \end{cases}. \quad (11)$$

The step S0244b is "Calculating vehicle platoon total delay time", and represents that calculating a total delay time range $(T^*_{min}, T^*_{max})$ according to the reaction times $t^*_{a_{min}}$, $t^*_{a_{max}}$, the control delay time $t^*_{con}$, the communication delay time $t^*_{com}$ and the vehicle platoon load gradient response time $(t^*_m + t^*_{slo})$. The total delay time range $(T^*_{min}, T^*_{max})$ meets the following equation (12):

$$\begin{bmatrix} T^*_{max} \\ T^*_{min} \end{bmatrix} = \begin{bmatrix} t^*_{a_{max}} \\ t^*_{a_{min}} \end{bmatrix} + \begin{bmatrix} t^*_{con} + t^*_{com} + t^*_m + t^*_{slo} \\ t^*_{con} + t^*_{com} + t^*_m + t^*_{slo} \end{bmatrix}. \quad (12)$$

The step S0244c is "Adjusting acceleration range according to total delay time" and "$(a_{pa}, a_{min}^f, a_{max}^f)/(a_{min}^f, a_{max}^f)$", and represents that calculating the driving acceleration range $(a_{min}^f, a_{max}^f)$ according to the vehicle speed V and the total delay time range $(T^*_{min}, T^*_{max})$. The driving acceleration range $(a_{min}^f, a_{max}^f)$ meets the following equation (13):

$$V = V_0 + at; \begin{cases} a_{max}^f = \dfrac{V - V_0}{T^*_{max}} \\ a_{min}^f = \dfrac{V - V_0}{T^*_{min}} \end{cases}. \quad (13)$$

In the step S0244c, in response to determining that the driving mode judging result is that the leading vehicle 200 is in the autonomous mode, outputting the driving acceleration range $(a_{min}^f, a_{max}^f)$. In response to determining that the driving mode judging result is that the leading vehicle 200 is in the manual mode, outputting the driving acceleration range $(a_{min}^f, a_{max}^f)$ and the compensated acceleration $a_{pa}$.

The step S0245 is "Using quadratic programming to solve simultaneous differential equation $\dot{x}=Ax+Bu$ of vehicle platoon following acceleration command", and represents that setting the leading vehicle parameter group 212 and the vehicle speed limit, the road curvature and a vehicle platoon following time interval of the at least one following vehicle parameter group 312 as a limiting condition, and using a quadratic programming (QP) to solve a simultaneous differential equation $\dot{x}=Ax+Bu$ to generate a best solution of a vehicle platoon following acceleration u. Parameter matrixes $\dot{X}$, A, x, B and the vehicle platoon following acceleration u of the simultaneous differential equation meet the following equation (14). Ts represents a sampling time. $\tau$ represents a control command response delay time, i.e., a response time of the command from an engine to a wheel. xp(t) represents a location of a host vehicle. xv(t) represents a speed of the host vehicle. xa(t) represents an acceleration of the host vehicle. u(t) represents an acceleration command. The detail of the QP is a conventional technology and will not be described again herein.

$$\begin{pmatrix} xp(t+Ts) \\ xv(t+Ts) \\ xa(t+Ts) \end{pmatrix} = \begin{pmatrix} 1 & Ts & 0 \\ 0 & 1 & Ts \\ 0 & 0 & 1 - Ts/\tau \end{pmatrix} \begin{pmatrix} xp(t) \\ xv(t) \\ xa(t) \end{pmatrix} + \begin{pmatrix} 0 \\ 0 \\ Ts/\tau \end{pmatrix} u(t). \quad (14)$$

The cloud acceleration estimating step S026 is performed to estimate the compensated acceleration $a_{pa}$ according to the leading vehicle parameter group 212. In detail, the cloud acceleration estimating step S026 includes a plurality of steps S0262, S0264, S0266. The step S0262 is "Executing front vehicle speed estimating module", and represents that transmitting the road curvature, the vehicle speed limit, the percentage of throttle brake and the current acceleration of the front vehicle of the leading vehicle parameter group 212 to a front vehicle speed estimating module, and then calculating an estimated speed of the front vehicle by the front vehicle speed estimating module according to the road curvature, the vehicle speed limit, the percentage of throttle brake and the current acceleration of the front vehicle. The step S0264 is "Using Kalman filter model to predict acceleration of front vehicle at t>T (T=current time)", and represents that using a Kalman filter model to compute the estimated speed of the front vehicle to generate an estimated acceleration of the front vehicle (i.e., the acceleration of the front vehicle at t>T). The step S0266 is "Estimating $a_{pa}$", and represents that estimating the compensated acceleration $a_{pa}$ corresponding the vehicle platoon according to the current acceleration of the front vehicle and the estimated acceleration of the front vehicle.

The vehicle platoon acceleration calculating step S028 is performed to calculate the vehicle platoon accelerations $a_f$ according to the driving mode judging result and at least one of the driving acceleration range ($a_{min}^f$, $a_{max}^f$) and the compensated acceleration $a_{pa}$. In detail, in the vehicle platoon acceleration calculating step S028, in response to determining that the driving mode judging result is that the leading vehicle 200 is in the autonomous mode, the cloud processing unit 410 calculates the vehicle platoon accelerations $a_f$ according to the driving acceleration range ($a_{min}^f$, $a_{max}^f$) and the vehicle platoon following acceleration u of the step S0245. The vehicle platoon accelerations $a_f$ meet the following equation (15):

$$a_f = \begin{cases} u, & \text{if } u \in [a_{min}^f, a_{max}^f] \\ a_{max}^f, & \text{if } u > a_{max}^f \\ a_{min}^f, & ow \end{cases} \quad (15)$$

ow represents other conditions. In response to determining that the driving mode judging result is that the leading vehicle 200 is in the manual mode, the cloud processing unit 410 calculates the vehicle platoon accelerations $a_f$ according to the driving acceleration range ($a_{min}^f$, $a_{max}^f$) and the compensated acceleration $a_{pa}$. The vehicle platoon accelerations $a_f$ meet the following equation (16):

$$a_f = \begin{cases} a_{pa}, & \text{if } a_{pa} \in [a_{min}^f, a_{max}^f] \\ a_{max}^f, & \text{if } a_{pa} > a_{max}^f \\ a_{min}^f, & ow \end{cases} \quad (16)$$

Therefore, the vehicle platoon following deciding system 100 based on cloud computing of the present disclosure utilizes the cloud parameter uniformizing step S024 and the cloud acceleration estimating step S026 to realize vehicle platoon following decisions in different driving modes, thereby not only effectively saving energy and increasing the safety of the vehicle platoon, but also reducing the cost of hardware and manpower.

Figure 6:
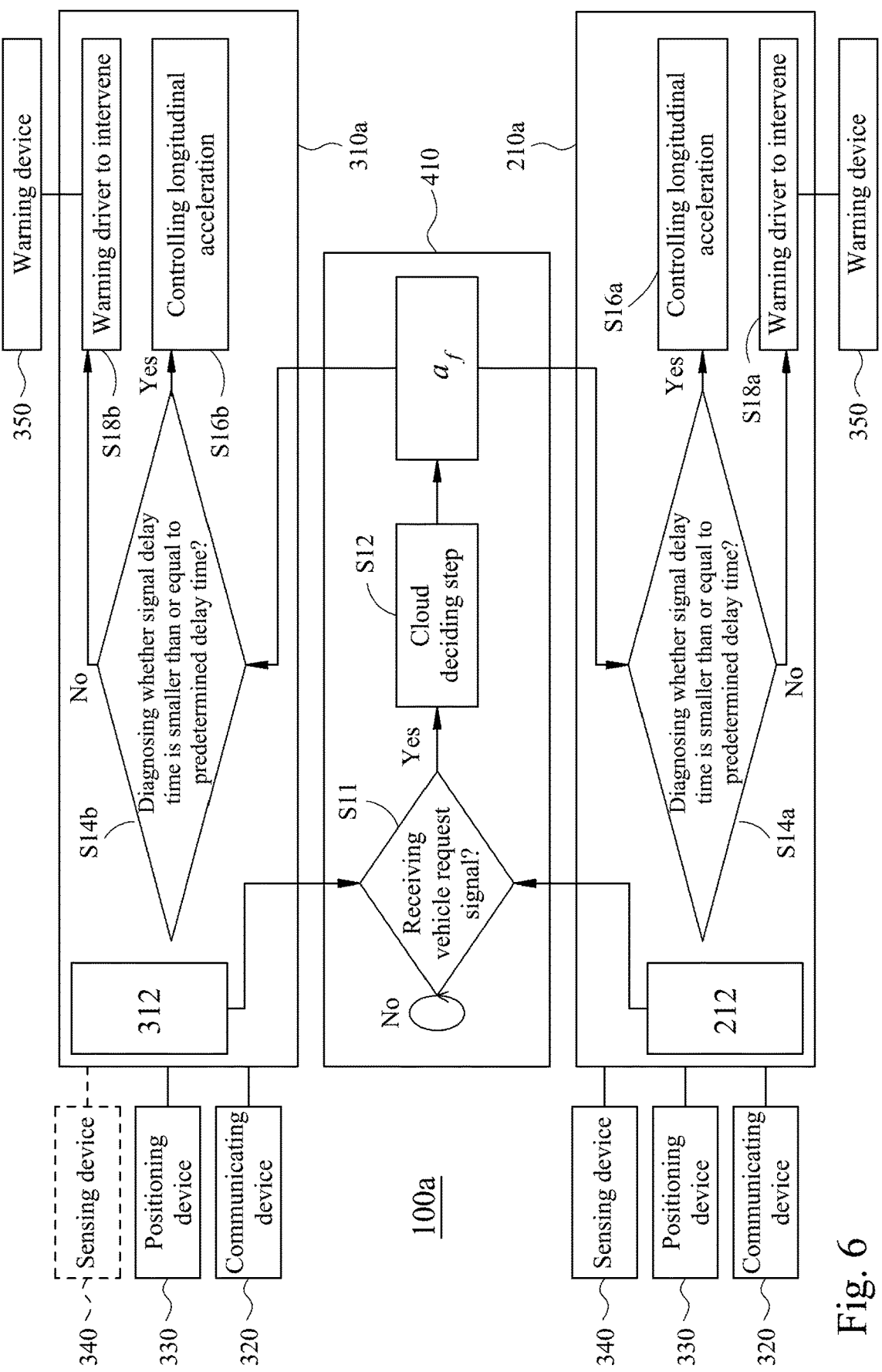
FIG. 6 shows a schematic view of a vehicle platoon following deciding system based on cloud computing according to a second embodiment of the present disclosure.

Please refer to FIGS. 1, 2, 3, 4, 5 and 6. FIG. 6 shows a schematic view of a vehicle platoon following deciding system 100a based on cloud computing according to a second embodiment of the present disclosure. The vehicle platoon following deciding system 100a based on cloud computing is configured to decide a plurality of vehicle platoon accelerations $a_f$ of a leading vehicle 200 and at least one following vehicle 300, and includes the leading vehicle 200, a leading vehicle processing unit 210a, a communicating device 220, a positioning device 230, a sensing device 240, a warning device 250, the at least one following vehicle 300, at least one following vehicle processing unit 310a, a communicating device 320, a positioning device 330, a sensing device 340, a warning device 350 and a cloud computing platform 400. The leading vehicle 200, the communicating device 220, the positioning device 230, the sensing device 240, the at least one following vehicle 300, the communicating device 320, the positioning device 330, the sensing device 340, a signal receiving step S11 and a cloud deciding step S12 of the cloud processing unit 410 are the same as the leading vehicle 200, the communicating device 220, the positioning device 230, the sensing device 240, the at least one following vehicle 300, the communicating device 320, the positioning device 330, the sensing device 340, a signal receiving step S01 and a cloud deciding step S02 of the cloud processing unit 410 of FIG. 2, respectively. In FIG. 6, one of the leading vehicle processing unit 210a and the at least one following vehicle processing unit 310a is configured to implement one of a delay diagnosing step S14a and at least one delay diagnosing step S14b. The one of the delay diagnosing step S14a and the at least one delay diagnosing step S14b includes diagnosing whether a signal delay time between the cloud processing unit 410 and the one of the leading vehicle processing unit 210a and the at least one following vehicle processing unit 310a is smaller than or equal to a predetermined delay time to generate a delay diagnosis result. The warning devices 250, 350 are signally connected to the leading vehicle processing unit 210a and the at least one following vehicle processing unit 310a, respectively. One of the warning devices 250, 350 determines whether to provide a warning signal according to the delay diagnosis result.

The leading vehicle processing unit 210a is configured to implement the delay diagnosing step S14a. The delay diagnosing step S14a includes diagnosing whether the signal delay time between the cloud processing unit 410 and the leading vehicle processing unit 210a is smaller than or equal to the predetermined delay time to generate the delay diagnosis result. In detail, the delay diagnosing step S14a further includes configuring the leading vehicle processing unit 210a to receive the vehicle platoon accelerations $a_f$. The leading vehicle processing unit 210a is corresponding to the leading vehicle 200. In response to determining that the delay diagnosis result is that the signal delay time is smaller than or equal to the predetermined delay time, performing a step S16a. The step S16a is "Controlling longitudinal acceleration", and represents that configuring the leading vehicle processing unit 210a to control an acceleration of the leading vehicle 200 according to the vehicle platoon accelerations $a_f$. In response to determining that the delay diagnosis result is that the signal delay time is greater than the predetermined delay time, performing a step S18a. The step S18a is "Warning driver to intervene", and represents that configuring the warning device 250 to provide the warning signal for warning a driver to intervene.

The at least one following vehicle processing unit 310a is configured to implement the at least one delay diagnosing step S14b. The at least one delay diagnosing step S14b includes diagnosing whether the signal delay time between the cloud processing unit 410 and the at least one following vehicle processing unit 310a is smaller than or equal to the predetermined delay time to generate the delay diagnosis result. In detail, the delay diagnosing step S14b further includes configuring the at least one following vehicle processing unit 310a to receive the vehicle platoon accelerations $a_f$. The at least one following vehicle processing unit 310a is corresponding to the at least one following vehicle 300. In response to determining that the delay diagnosis result is that the signal delay time is smaller than or equal to the predetermined delay time, performing a step S16b. The step S16b is "Controlling longitudinal acceleration", and represents that configuring the at least one following vehicle processing unit 310a to control an acceleration of the at least one following vehicle 300 according to the vehicle platoon accelerations $a_f$. In response to determining that the delay diagnosis result is that the signal delay time is greater than the predetermined delay time, performing a step S18*b*. The step S18*b* is "Warning driver to intervene", and represents that configuring the warning device 350 to provide the warning signal for warning the driver to intervene.

Please refer to FIGS. 6, 7 and 8. FIG. 7 shows a schematic view of a signal delay time T of one of plurality of delay diagnosing steps S14*a*, S14*b* of FIG. 6, corresponding to a signal path. FIG. 8 shows a flow chart of estimation of the signal delay time T of the one of the delay diagnosing steps S14*a*, S14*b* of FIG. 6. The signal delay time T is equal to a sum of a signal sending time $T_{Send}$, a signal computing time $T_{Compute}$ and a signal receiving time $T_{Receive}$. The signal sending time $T_{Send}$ represents the time required for a signal to be transmitted from a vehicle end to a cloud end. The signal computing time $T_{Compute}$ represents the time required for the signal to be computed in the cloud end. The signal receiving time $T_{Receive}$ represents the time required for the signal to be transmitted from the cloud end to the vehicle end. The vehicle end may correspond to the leading vehicle 200 or the at least one following vehicle 300 in FIG. 1, and the cloud end may correspond to the cloud computing platform 400 in FIG. 1. In addition, the signal delay time T can be obtained by calculating a sending parameter Sindex and a receiving parameter Rindex, as shown in FIG. 8. Specifically, the vehicle end transmits the sending parameter Sindex (e.g., the sending parameter Sindex=1), the receiving parameter Rindex (e.g., the receiving parameter Rindex=1) and the number of delays $N_i$ (e.g., an initial value of the number of delays N=1) to the cloud end, and then the cloud end returns "Rindex=Sindex+1" to the vehicle end. The vehicle end confirms whether the sending parameter Sindex is not equal to the receiving parameter Rindex in a fixed period of time (e.g., 100 ms). If yes (i.e., the sending parameter Sindex is not equal to the receiving parameter Rindex), the vehicle end calculates "$T=N_i \times (100$ ms)" and diagnoses whether the signal delay time T is smaller than or equal to the predetermined delay time, and then executes "$N_i=1$". If no (i.e., the sending parameter Sindex is equal to the receiving parameter Rindex), the vehicle end calculates "$T=N_i \times (100$ ms)" and diagnoses whether the signal delay time T is smaller than or equal to the predetermined delay time, and then executes "$N_i=N_i+1$". The predetermined delay time can be set according to requirements. In one embodiment, the predetermined delay time may be 300 ms, but the present disclosure is not limited thereto.

Therefore, the vehicle platoon following deciding system 100*a* based on cloud computing of the present disclosure utilizes the delay diagnosing steps S14*a*, S14*b* to confirm whether the signal delay time T is within the allowable predetermined delay time to realize a delay self-diagnosis. If the signal delay time T is not within the allowable predetermined delay time, the vehicle platoon following deciding system 100*a* provides the warning signal to protect the safety of the vehicle platoon.

Figure 9:
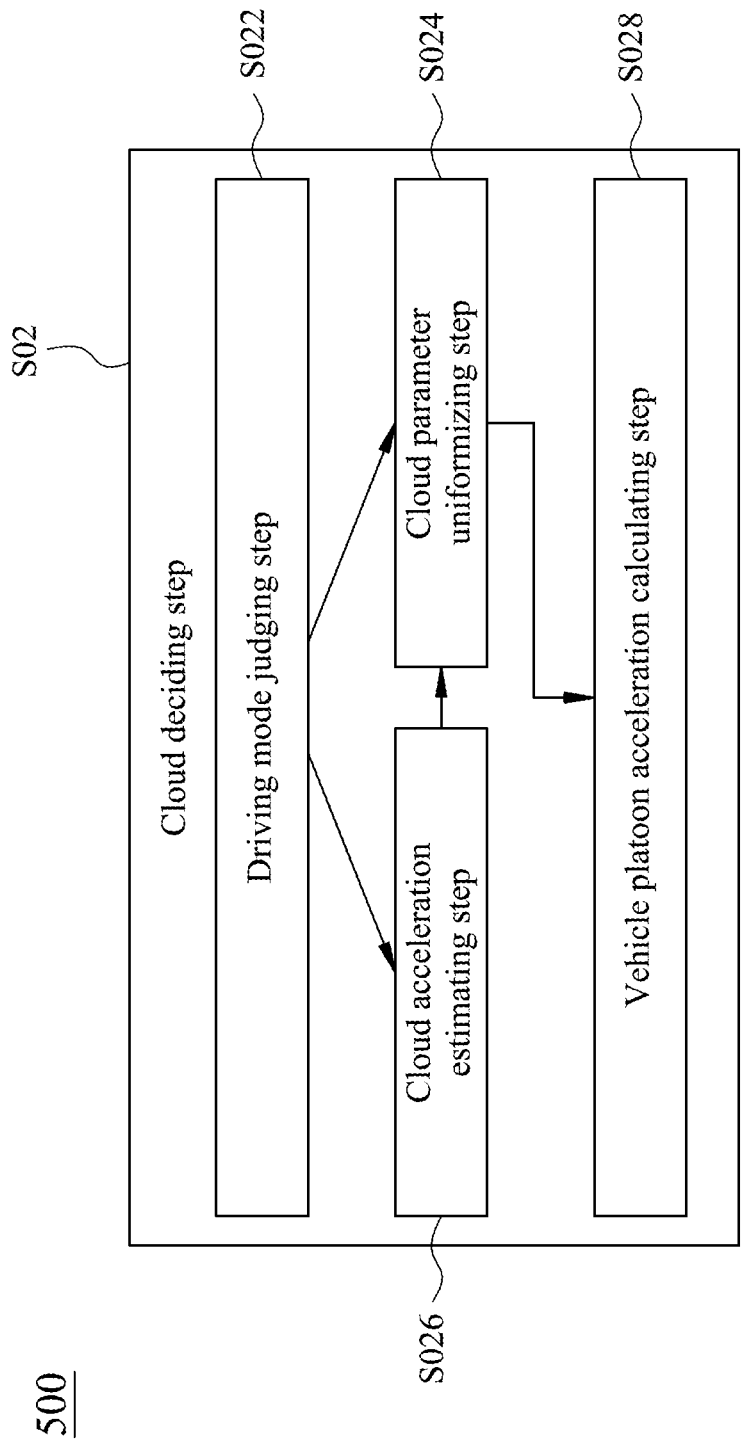
FIG. 9 shows a flow chart of a deciding method of a vehicle platoon following deciding system based on cloud computing according to a third embodiment of the present disclosure.

Please refer to FIGS. 1, 2, 3 and 9. FIG. 9 shows a flow chart of a deciding method 500 of a vehicle platoon following deciding system 100 based on cloud computing according to a third embodiment of the present disclosure. The deciding method 500 of the vehicle platoon following deciding system 100 based on cloud computing is configured to decide a plurality of vehicle platoon accelerations $a_f$ of a leading vehicle 200 and at least one following vehicle 300, and includes performing a cloud deciding step S02. The cloud deciding step S02 includes performing a driving mode judging step S022, a cloud parameter uniformizing step S024, a cloud acceleration estimating step S026 and a vehicle platoon acceleration calculating step S028. The driving mode judging step S022 is performed to configure a cloud processing unit 410 to judge whether the leading vehicle 200 is manually driven according to a leading vehicle parameter group 212 to generate a driving mode judging result. The cloud parameter uniformizing step S024 includes configuring the cloud processing unit 410 to calculate a driving acceleration range $(a_{min}^f, a_{max}^f)$ according to the leading vehicle acceleration range $(a_L^1, a_U^1)$ and the at least one following vehicle acceleration range $(a_L^2, a_U^2)$-$(a_L^N, a_U^N)$. The cloud acceleration estimating step S026 is performed to configure the cloud processing unit 410 to estimate a compensated acceleration $a_{pa}$ according to the leading vehicle parameter group 212. The vehicle platoon acceleration calculating step S028 is performed to configure the cloud processing unit 410 to calculate the vehicle platoon accelerations $a_f$ according to the driving mode judging result and at least one of the driving acceleration range $(a_{min}^f, a_{max}^f)$ and the compensated acceleration $a_{pa}$.

Figure 10:
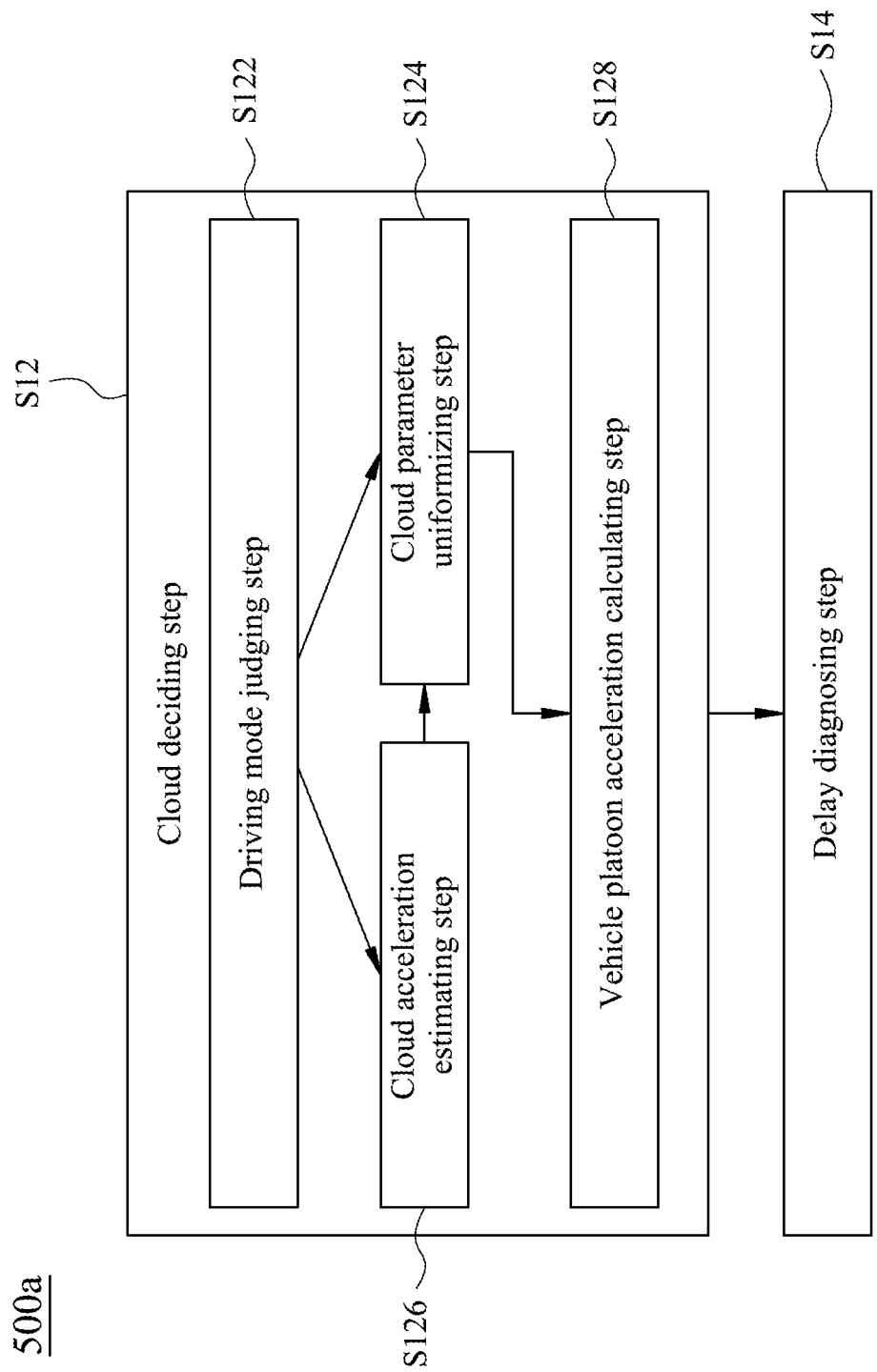
FIG. 10 shows a flow chart of a deciding method of a vehicle platoon following deciding system based on cloud computing according to a fourth embodiment of the present disclosure.

Please refer to FIGS. 6 and 10. FIG. 10 shows a flow chart of a deciding method 500*a* of a vehicle platoon following deciding system 100*a* based on cloud computing according to a fourth embodiment of the present disclosure. The deciding method 500*a* is applied to the vehicle platoon following deciding system 100*a* based on cloud computing, and includes performing a cloud deciding step S12 and a delay diagnosing step S14. The cloud deciding step S12 includes performing a driving mode judging step S122, a cloud parameter uniformizing step S124, a cloud acceleration estimating step S126 and a vehicle platoon acceleration calculating step S128. The cloud deciding step S12 is the same as the cloud deciding step S12 of FIG. 6. The delay diagnosing step S14 corresponds to one of the delay diagnosing steps S14*a*, S14*b* of FIG. 6. The delay diagnosing step S14 includes diagnosing whether a signal delay time T between the cloud processing unit 410 and one of a leading vehicle processing unit 210*a* and at least one following vehicle processing unit 310*a* is smaller than or equal to a predetermined delay time to generate a delay diagnosis result. Therefore, the deciding method 500*a* of the vehicle platoon following deciding system 100*a* based on cloud computing of the present disclosure utilizes the delay diagnosing step S14 to confirm whether the signal delay time T is within the allowable predetermined delay time to realize a delay self-diagnosis. If the signal delay time T is not within the allowable predetermined delay time, the vehicle platoon following deciding system 100*a* provides the warning signal to protect the safety of the vehicle platoon.

Figure 11:
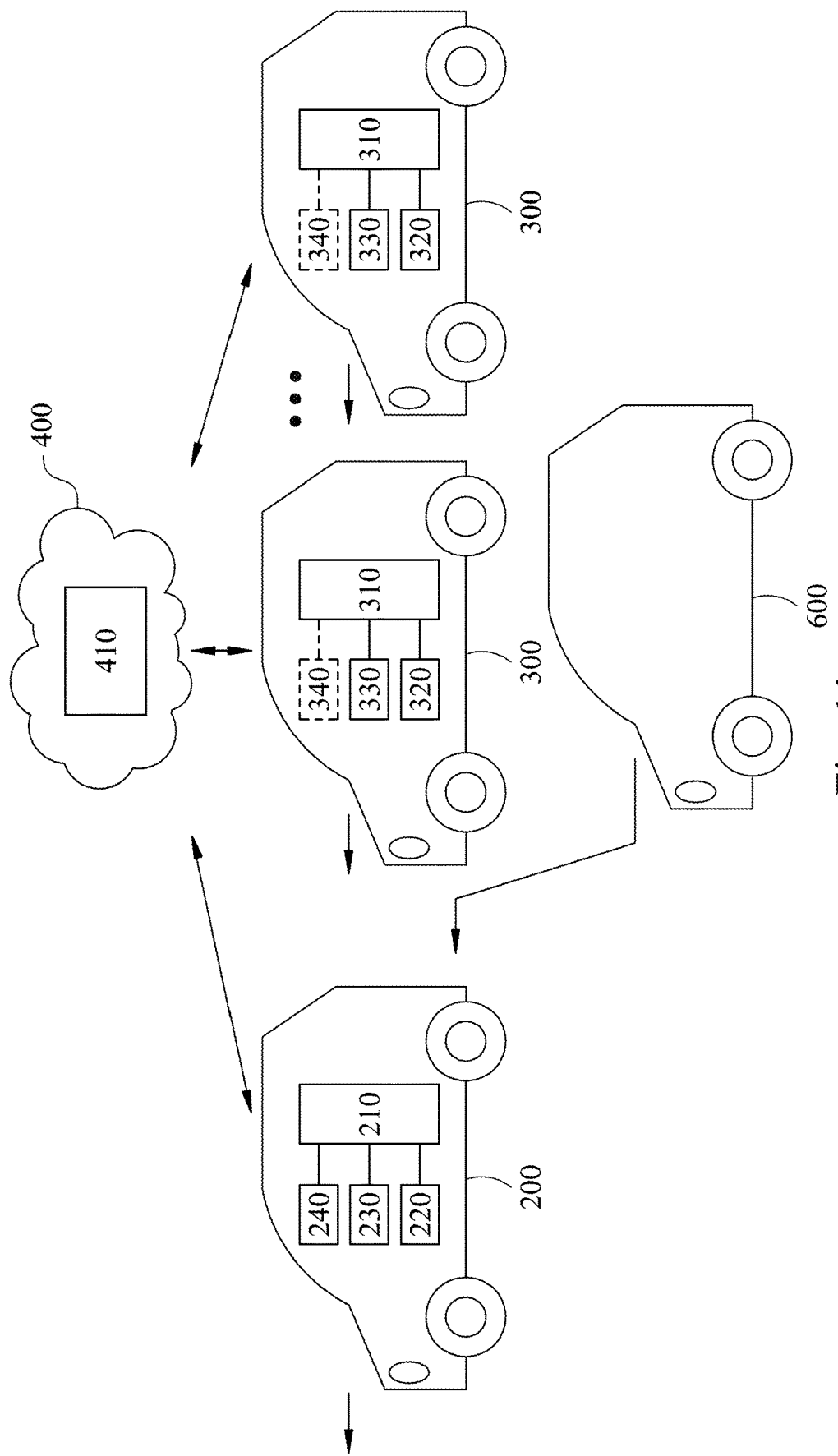
FIG. 11 shows a schematic view of a vehicle platoon following deciding system based on cloud computing for processing a scene with an obstacle cut-in according to a fifth embodiment of the present disclosure.
Figure 12:
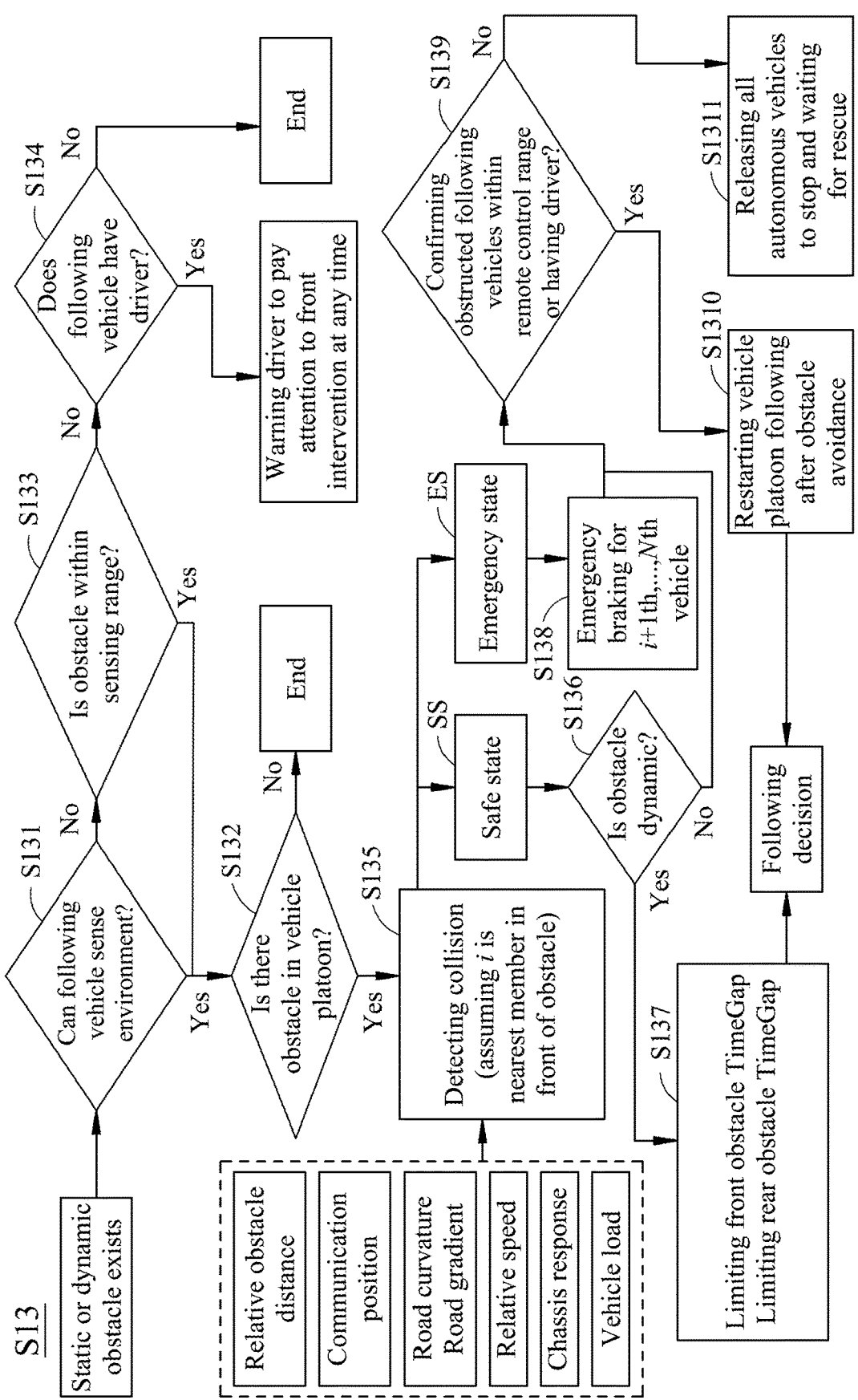
FIG. 12 shows a flow chart of a deciding method of a vehicle platoon following deciding system based on cloud computing for processing a scene with an obstacle cut-in according to a sixth embodiment of the present disclosure.

Please refer to FIGS. 6, 11 and 12. FIG. 11 shows a schematic view of a vehicle platoon following deciding system based on cloud computing for processing a scene with an obstacle 600 cut-in according to a fifth embodiment of the present disclosure. FIG. 12 shows a flow chart of a deciding method of a vehicle platoon following deciding system based on cloud computing for processing a scene with an obstacle 600 cut-in according to a sixth embodiment of the present disclosure. The vehicle platoon following deciding system based on cloud computing includes at least one of the sensing devices 240, 340. The at least one of the sensing devices 240, 340 is disposed on one of the leading vehicle 200 and the at least one following vehicle 300, and signally connected to one of the leading vehicle processing unit 210*a* and the at least one following vehicle processing unit 310*a*. The at least one of the sensing devices 240, 340 is configured to sense a surrounding environment of the one of the leading vehicle 200 and the at least one following vehicle 300 to judge whether there is at least one obstacle 600 between the leading vehicle 200 and the at least one following vehicle 300.

The deciding method of the vehicle platoon following deciding system based on cloud computing includes performing an obstacle cut-in deciding step S13. The obstacle cut-in deciding step S13 is performed to configure the at least one of the sensing devices 240, 340 to sense the surrounding environment of the one of the leading vehicle 200 and the at least one following vehicle 300 to judge whether there is the at least one obstacle 600 between the leading vehicle 200 and the at least one following vehicle 300. In response to determining that there is the at least one obstacle 600 between the leading vehicle 200 and the at least one following vehicle 300, the at least one of the sensing devices 240, 340 generates at least one relative obstacle distance and at least one obstacle speed, and the one of the leading vehicle processing unit 210a and the at least one following vehicle processing unit 310a transmits the at least one relative obstacle distance and the at least one obstacle speed to the cloud processing unit 410, so that the cloud processing unit 410 analyzes that the one of the leading vehicle 200 and the at least one following vehicle 300 is in one of a safe state SS and an emergency state ES. In detail, the obstacle cut-in deciding step S13 includes a plurality of steps S131, S132, S133, S134, S135, S136, S137, S138, S139, S1310, S1311. The step S131 is "Can following vehicle sense environment?", and represents that confirming whether the at least one following vehicle 300 can sense the surrounding environment. If yes (i.e., the sensing device 340 is disposed on the at least one following vehicle 300), performing the step S132. If no, performing the step S133. The step S132 is "Is there obstacle in vehicle platoon?", and represents that confirming whether there is the at least one obstacle 600 in the vehicle platoon. If yes, performing the step S135. If no, ending the obstacle cut-in deciding step S13. The step S133 is "Is obstacle within sensing range?", and represents that confirming whether the at least one obstacle 600 is within a sensing range of the leading vehicle 200 or a sensing range of a roadside detection device. If yes, performing the step S132. If no, performing the step S134. The step S134 is "Does following vehicle have driver?", and represents that confirming whether the at least one following vehicle 300 has a driver. If yes, warning the driver to pay attention to front intervention at any time. If no, ending the obstacle cut-in deciding step S13. The step S135 is "Detecting collision (assuming i is nearest member in front of obstacle)", and represents that configuring the cloud processing unit 410 analyzes that the at least one following vehicle 300 is in one of the safe state SS and the emergency state ES according to a relative obstacle distance, a communication position, a road curvature, a road gradient, a relative speed, a chassis response and a vehicle load. The communication position includes a communication delay and a current coordinate. The relative speed represents the relative speed between the at least one obstacle 600 and the vehicle end.

Furthermore, assuming that the number of at least one obstacle 600 and the number of the at least one obstacle speed are both plural. In response to determining that the at least one following vehicle 300 is in the safe state SS, performing the step S136. The step S136 is "Is obstacle dynamic?", and represents that confirming whether the obstacle speeds of the obstacles 600 are greater than 0 m/s. If yes (i.e., the obstacle speeds corresponding to the obstacles 600 are all greater than 0 m/s), performing the step S137. If no, performing the step S139. In response to determining that the at least one following vehicle 300 is in the emergency state ES, performing the steps S138, S139. The step S137 is "Limiting front obstacle TimeGap" and "Limiting rear obstacle TimeGap", and represents that configuring the cloud processing unit 410 to further analyze a front obstacle time interval (corresponding to "Limiting front obstacle TimeGap") and a rear obstacle time interval (corresponding to "Limiting rear obstacle TimeGap") between the at least one following vehicle 300 and the obstacles 600 to generate safety compliance following decisions under the condition of the obstacles 600 cut-in (belonging to a multi cut-in scene). In addition, the step S138 is "Emergency braking for i+1th, . . . , Nth vehicle", and represents that configuring the i+1 th to Nth following vehicles 300 to emergency brake. For example, in FIG. 11, i is equal to 1 (the nearest member of the vehicle platoon in front of the obstacle 600 is the leading vehicle 200), and the step S138 is configuring the 2nd to Nth following vehicles 300 to emergency brake. The step S139 is "Confirming obstructed following vehicles within remote control range or having driver?", and represents that confirming whether the obstructed following vehicles 300 (i.e., the i+1th to Nth following vehicles 300) are within a remote control range or has a driver. If yes, performing the step S1310. If no, performing the step S1311. The step S1310 is "Restarting vehicle platoon following after obstacle avoidance", and represents that controlling the obstructed following vehicles 300 (i.e., the i+1th to Nth following vehicles 300) to avoid the obstacle 600 by a remote end or the driver, and restarting the obstructed following vehicles 300 to follow the leading vehicle 200 after the obstacle avoidance. The step S1311 is "Releasing all autonomous vehicles to stop and waiting for rescue", and represents that controlling the leading vehicle 200 and the at least one following vehicle 300 to stop and waiting for rescue.

Therefore, the deciding method of the vehicle platoon following deciding system based on cloud computing of the present disclosure processes a scene with the obstacles 600 cut-in by the obstacle cut-in deciding step S13 and consider a front vehicle time interval and a rear vehicle time interval (i.e., the front obstacle time interval and the rear obstacle time interval) at the same time, thus avoiding serious consequences (e.g., the collision and the vehicle accident) without considering the rear obstacle time interval in a conventional technology, and greatly increasing the overall safety of the vehicle platoon when the obstacles 600 cut-in.

In other embodiments, the cloud processing unit 410 may be disposed on the leading vehicle 200, or combined with the leading vehicle processing unit 210 to be disposed on the leading vehicle 200. In other words, the vehicle platoon following decision can be performed by the leading vehicle 200 (i.e., the vehicle end) instead of the cloud end. In addition, each of the leading vehicle processing units 210, 210a, the following vehicle processing units 310, 310a and the cloud processing unit 410 of the present disclosure may be a microprocessor, an electronic control unit (ECU), a computer, a mobile device or other computing processors, but the present disclosure is not limited thereto. Moreover, the driver of the leading vehicle 200 and the at least one following vehicle 300 may be optional. If the leading vehicle 200 is in the manual mode, the leading vehicle 200 has the driver. The roadside detection device may be disposed on the driving path in the vehicle platoon following deciding system according to requirements. If the roadside detection device is disposed in the vehicle platoon following deciding system, the roadside detection device is configured to transmit a roadside detected signal to the cloud processing unit 410 for subsequent judgment and analysis.

According to the aforementioned embodiments and examples, the advantages of the present disclosure are described as follows.

1. The vehicle platoon following deciding system based on cloud computing and the deciding method thereof of the present disclosure utilize the cloud parameter uniformizing step and the cloud acceleration estimating step to realize the vehicle platoon following decisions and the multi obstacles cut-in decisions in different driving modes.

2. The vehicle platoon following deciding system based on cloud computing and the deciding method thereof of the present disclosure utilize the delay diagnosing steps to confirm whether the signal delay time is within the allowable predetermined delay time to realize a delay self-diagnosis. In addition, the present disclosure realizes the vehicle platoon following decision, the multi obstacles cut-in decision and the delay self-diagnosis by the combination of the cloud deciding step of the cloud end and the delay diagnosing step of the vehicle end, thereby not only effectively saving energy and increasing the safety of the vehicle platoon, but also reducing the cost of hardware and manpower.

3. The vehicle platoon following deciding system based on cloud computing and the deciding method thereof of the present disclosure process a scene with the obstacles cut-in by the obstacle cut-in deciding step and consider the front obstacle time interval and the rear obstacle time interval at the same time, thus avoiding serious consequences without considering the rear obstacle time interval in a conventional technology, and greatly increasing the overall safety of the vehicle platoon when the obstacles cut-in.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A vehicle platoon following deciding system based on cloud computing, which is configured to decide a plurality of vehicle platoon accelerations of a leading vehicle and at least one following vehicle, the vehicle platoon following deciding system based on cloud computing comprising:
   a leading vehicle processor disposed on the leading vehicle and configured to generate a leading vehicle parameter group, wherein the leading vehicle parameter group comprises a leading vehicle acceleration range;
   at least one following vehicle processor disposed on the at least one following vehicle and configured to generate at least one following vehicle parameter group, wherein the at least one following vehicle parameter group comprises at least one following vehicle acceleration range; and
   a cloud processor signally connected to the leading vehicle processor and the at least one following vehicle processor, and receiving the leading vehicle parameter group and the at least one following vehicle parameter group, wherein the cloud processor is configured to implement a cloud deciding step comprising:
      performing a driving mode judging step to judge whether the leading vehicle is manually driven according to the leading vehicle parameter group to generate a driving mode judging result;
      performing a cloud parameter uniformizing step comprising calculating a driving acceleration range according to the leading vehicle acceleration range and the at least one following vehicle acceleration range;
      performing a cloud acceleration estimating step to estimate a compensated acceleration according to the leading vehicle parameter group; and
      performing a vehicle platoon acceleration calculating step to calculate the vehicle platoon accelerations according to the driving mode judging result and at least one of the driving acceleration range and the compensated acceleration;
   wherein the leading vehicle processor is configured to control an acceleration of the leading vehicle according to the vehicle platoon accelerations, and the at least one following vehicle processor is configured to control an acceleration of the at least one following vehicle according to the vehicle platoon accelerations.

2. The vehicle platoon following deciding system based on cloud computing of claim 1, wherein in the vehicle platoon acceleration calculating step,
   in response to determining that the driving mode judging result is that the leading vehicle is in an autonomous mode, the cloud processor calculates the vehicle platoon accelerations according to the driving acceleration range; and
   in response to determining that the driving mode judging result is that the leading vehicle is in a manual mode, the cloud processor calculates the vehicle platoon accelerations according to the driving acceleration range and the compensated acceleration.

3. The vehicle platoon following deciding system based on cloud computing of claim 1, wherein,
   the leading vehicle processor is configured to generate a leading vehicle control delay time and a leading vehicle communication delay time;
   the at least one following vehicle processor is configured to generate at least one following vehicle control delay time and at least one following vehicle communication delay time; and
   the cloud parameter uniformizing step further comprises:
      calculating a control delay time according to the leading vehicle control delay time and the at least one following vehicle control delay time; and
      calculating a communication delay time according to the leading vehicle communication delay time and the at least one following vehicle communication delay time.

4. The vehicle platoon following deciding system based on cloud computing of claim 3, wherein,
   the leading vehicle parameter group comprises a vehicle speed, a vehicle load and a road gradient; and
   the cloud parameter uniformizing step further comprises:
      calculating a vehicle platoon load gradient response time according to the vehicle speed, the vehicle load and the road gradient.

5. The vehicle platoon following deciding system based on cloud computing of claim 4, wherein the cloud parameter uniformizing step further comprises:

calculating a uniformized acceleration range parameter according to the leading vehicle acceleration range and the at least one following vehicle acceleration range; and calculating a total delay time range according to the vehicle speed, the uniformized acceleration range parameter, the control delay time, the communication delay time and the vehicle platoon load gradient response time, and then calculating the driving acceleration range according to the vehicle speed and the total delay time range.

6. The vehicle platoon following deciding system based on cloud computing of claim 1, wherein, the leading vehicle parameter group comprises a road curvature, a percentage of throttle brake and a current acceleration of a front vehicle; and the cloud acceleration estimating step comprises:
estimating the compensated acceleration by calculating the road curvature, the percentage of throttle brake and the current acceleration of the front vehicle according to a Kalman filter model.

7. The vehicle platoon following deciding system based on cloud computing of claim 1, further comprising:

a sensing device disposed on one of the leading vehicle and the at least one following vehicle, and signally connected to one of the leading vehicle processor and the at least one following vehicle processor, wherein the sensing device is configured to sense a surrounding environment of the one of the leading vehicle and the at least one following vehicle to judge whether there is at least one obstacle between the leading vehicle and the at least one following vehicle;

wherein in response to determining that there is the at least one obstacle between the leading vehicle and the at least one following vehicle, the sensing device generates at least one relative obstacle distance and at least one obstacle speed, and the one of the leading vehicle processor and the at least one following vehicle processor transmits the at least one relative obstacle distance and the at least one obstacle speed to the cloud processor, so that the cloud processor analyzes that the at least one following vehicle is in one of a safe state and an emergency state.

8. The vehicle platoon following deciding system based on cloud computing of claim 7, wherein a number of the at least one obstacle and a number of the at least one obstacle speed are both plural;

wherein in response to determining that the cloud processor analyzes that the at least one following vehicle is in the safe state, and the obstacle speeds corresponding to the obstacles are all greater than 0 m/s, the cloud processor further analyzes a front obstacle time interval and a rear obstacle time interval between the at least one following vehicle and the obstacles;

wherein in response to determining that the cloud processor analyzes that the at least one following vehicle is in the emergency state, the cloud processor controls the at least one following vehicle to perform braking.

9. A vehicle platoon following deciding system based on cloud computing, which is configured to decide a plurality of vehicle platoon accelerations of a leading vehicle and at least one following vehicle, the vehicle platoon following deciding system based on cloud computing comprising:

a leading vehicle processor disposed on the leading vehicle and configured to generate a leading vehicle parameter group, wherein the leading vehicle parameter group comprises a leading vehicle acceleration range;

at least one following vehicle processor disposed on the at least one following vehicle and configured to generate at least one following vehicle parameter group, wherein the at least one following vehicle parameter group comprises at least one following vehicle acceleration range; and a cloud processor signally connected to the leading vehicle processor and the at least one following vehicle processor, and receiving the leading vehicle parameter group and the at least one following vehicle parameter group, wherein the cloud processor is configured to implement a cloud deciding step comprising generating a driving mode judging result, a driving acceleration range and a compensated acceleration according to the leading vehicle parameter group, the leading vehicle acceleration range and the at least one following vehicle acceleration range, and then calculating the vehicle platoon accelerations according to the driving mode judging result and at least one of the driving acceleration range and the compensated acceleration;

wherein one of the leading vehicle processor and the at least one following vehicle processor is configured to implement a delay diagnosing step, the delay diagnosing step comprises diagnosing whether a signal delay time between the cloud processor and the one of the leading vehicle processor and the at least one following vehicle processor is smaller than or equal to a predetermined delay time to generate a delay diagnosis result.

10. The vehicle platoon following deciding system based on cloud computing of claim 9, further comprising:

a warning device signally connected to the one of the leading vehicle processor and the at least one following vehicle processor, wherein the warning device determines whether to provide a warning signal according to the delay diagnosis result.

11. The vehicle platoon following deciding system based on cloud computing of claim 10, wherein the delay diagnosing step further comprises:

configuring the one of the leading vehicle processor and the at least one following vehicle processor to receive the vehicle platoon accelerations, wherein the one of the leading vehicle processor and the at least one following vehicle processor is corresponding to one of the leading vehicle and the at least one following vehicle;

in response to determining that the delay diagnosis result is that the signal delay time is smaller than or equal to the predetermined delay time, configuring the one of the leading vehicle processor and the at least one following vehicle processor to control an acceleration of the one of the leading vehicle and the at least one following vehicle according to the vehicle platoon accelerations; and in response to determining that the delay diagnosis result is that the signal delay time is greater than the predetermined delay time, configuring the warning device to provide the warning signal.

12. The vehicle platoon following deciding system based on cloud computing of claim 9, wherein the cloud deciding step further comprises:

performing a driving mode judging step to judge whether the leading vehicle is manually driven according to the leading vehicle parameter group to generate the driving mode judging result;

performing a cloud parameter uniformizing step comprising calculating the driving acceleration range according to the leading vehicle acceleration range and the at least one following vehicle acceleration range; and performing a cloud acceleration estimating step to estimate the compensated acceleration according to the leading vehicle parameter group.

13. The vehicle platoon following deciding system based on cloud computing of claim 9, wherein in the cloud deciding step, in response to determining that the driving mode judging result is that the leading vehicle is in an autonomous mode, the cloud processor calculates the vehicle platoon accelerations according to the driving acceleration range; and in response to determining that the driving mode judging result is that the leading vehicle is in a manual mode, the cloud processor calculates the vehicle platoon accelerations according to the driving acceleration range and the compensated acceleration.

14. The vehicle platoon following deciding system based on cloud computing of claim 12, wherein, the leading vehicle processor is configured to generate a leading vehicle control delay time and a leading vehicle communication delay time;

the at least one following vehicle processor is configured to generate at least one following vehicle control delay time and at least one following vehicle communication delay time; and the cloud parameter uniformizing step further comprises:
calculating a control delay time according to the leading vehicle control delay time and the at least one following vehicle control delay time; and
calculating a communication delay time according to the leading vehicle communication delay time and the at least one following vehicle communication delay time.

15. The vehicle platoon following deciding system based on cloud computing of claim 14, wherein, the leading vehicle parameter group comprises a vehicle speed, a vehicle load and a road gradient; and the cloud parameter uniformizing step further comprises:
calculating a vehicle platoon load gradient response time according to the vehicle speed, the vehicle load and the road gradient.

16. The vehicle platoon following deciding system based on cloud computing of claim 15, wherein the cloud parameter uniformizing step further comprises:

calculating a uniformized acceleration range parameter according to the leading vehicle acceleration range and the at least one following vehicle acceleration range; and calculating a total delay time range according to the vehicle speed, the uniformized acceleration range parameter, the control delay time, the communication delay time and the vehicle platoon load gradient response time, and then calculating the driving acceleration range according to the vehicle speed and the total delay time range.

17. The vehicle platoon following deciding system based on cloud computing of claim 12, wherein, the leading vehicle parameter group comprises a road curvature, a percentage of throttle brake and a current acceleration of a front vehicle; and the cloud acceleration estimating step comprises:
estimating the compensated acceleration by calculating the road curvature, the percentage of throttle brake and the current acceleration of the front vehicle according to a Kalman filter model.

18. A deciding method of a vehicle platoon following deciding system based on cloud computing, which is configured to decide a plurality of vehicle platoon accelerations of a leading vehicle and at least one following vehicle, the deciding method of the vehicle platoon following deciding system based on cloud computing comprising:

performing a cloud deciding step comprising:
performing a driving mode judging step to configure a cloud processor to judge whether the leading vehicle is manually driven according to a leading vehicle parameter group to generate a driving mode judging result;

performing a cloud parameter uniformizing step comprising configuring the cloud processor to calculate a driving acceleration range according to a leading vehicle acceleration range and at least one following vehicle acceleration range;

performing a cloud acceleration estimating step to configure the cloud processor to estimate a compensated acceleration according to the leading vehicle parameter group; and performing a vehicle platoon acceleration calculating step to configure the cloud processor to calculate the vehicle platoon accelerations according to the driving mode judging result and at least one of the driving acceleration range and the compensated acceleration;

wherein a leading vehicle processor is configured to control an acceleration of the leading vehicle according to the vehicle platoon accelerations, and at least one following vehicle processor is configured to control an acceleration of the at least one following vehicle according to the vehicle platoon accelerations.

19. The deciding method of the vehicle platoon following deciding system based on cloud computing of claim 18, further comprising:

performing a delay diagnosing step comprising diagnosing whether a signal delay time between the cloud processor and one of a leading vehicle processor and at least one following vehicle processor is smaller than or equal to a predetermined delay time;

wherein the leading vehicle processor and the at least one following vehicle processor are disposed on the leading vehicle and the at least one following vehicle, respectively.

20. The deciding method of the vehicle platoon following deciding system based on cloud computing of claim 19, wherein the cloud deciding step further comprises:

performing an obstacle cut-in deciding step to configure a sensing device to sense a surrounding environment of one of the leading vehicle and the at least one following vehicle to judge whether there is at least one obstacle between the leading vehicle and the at least one following vehicle;

wherein in response to determining that there is the at least one obstacle between the leading vehicle and the at least one following vehicle, the sensing device generates at least one relative obstacle distance and at least one obstacle speed, and the one of the leading vehicle processor and the at least one following vehicle processor transmits the at least one relative obstacle distance and the at least one obstacle speed to the cloud processor, so that the cloud processor analyzes that the one of the leading vehicle and the at least one following vehicle is in one of a safe state and an emergency state.

\* \* \* \* \*